(12) United States Patent
Hertzog et al.

(10) Patent No.: US 11,382,254 B2
(45) Date of Patent: Jul. 12, 2022

(54) AGRICULTURAL PLOUGH AND METHOD FOR OPERATING

(71) Applicant: CNH Industrial America LLC, New Holland, PA (US)

(72) Inventors: Daniel Hertzog, Blackstad (SE); Bengt Per-Inge Linderson, Odensvi (SE); Per Dennis Wallin, Västervik (SE); Carl Ola Fredrik Nilsson, Västervik (SE); Robert Svensson, Loftahammar (SE); Rickard Karl Gustav Nåhdin, Gamleby (SE)

(73) Assignee: CNH Industrial America LLC, New Holland, PA (US)

( * ) Notice: Subject to any disclaimer, the term of this patent is extended or adjusted under 35 U.S.C. 154(b) by 112 days.

(21) Appl. No.: 16/848,288

(22) Filed: Apr. 14, 2020

(65) Prior Publication Data
US 2020/0337210 A1 Oct. 29, 2020

(51) Int. Cl.
*A01B 79/00* (2006.01)
*A01B 63/00* (2006.01)
*A01B 63/24* (2006.01)

(52) U.S. Cl.
CPC .......... *A01B 79/005* (2013.01); *A01B 63/004* (2013.01); *A01B 63/245* (2013.01)

(58) Field of Classification Search
CPC . A01B 3/42–44; A01B 79/005; A01B 63/004; A01B 63/245
See application file for complete search history.

(56) References Cited

U.S. PATENT DOCUMENTS 3,524,509 A * 8/1970 Richey .................. A01B 3/464
172/225
4,119,157 A * 10/1978 Schuck et al. ............ E02F 5/14
405/181

(Continued)

FOREIGN PATENT DOCUMENTS

EP 0200489 A2 * 11/1986
EP 0216997 A2 * 4/1987

(Continued)

OTHER PUBLICATIONS

Extended European Search Report for EP Application No. 19171129.0 dated Nov. 6, 2019 (seven pages).

*Primary Examiner* — Tara Mayo-Pinnock
(74) *Attorney, Agent, or Firm* — Rebecca L. Henkel; Rickard K. DeMille

(57) ABSTRACT

The present disclosure relates to an agricultural plough arrangement comprising an agricultural work vehicle and a plough implement connected to the agricultural work vehicle and comprising at least one ground engaging tool. At least one actuator mechanism is configured to move the plough implement laterally with respect to the agricultural work vehicle, wherein a control unit is provided that is to:
receive field-data indicative of conditions of a field across which the agricultural plough arrangement is being moved;
automatically determine an actuator-control-signal for the actuator mechanism based on the field-data, wherein the actuator-control-signal is for moving the plough implement laterally with respect to the agricultural work vehicle on the basis of the field-data received.

20 Claims, 9 Drawing Sheets

(56) References Cited

U.S. PATENT DOCUMENTS

| | | | | |
|---|---|---|---|---|
| 5,381,866 A | * | 1/1995 | Mong | A01B 3/466 |
| | | | | 172/219 |
| 5,992,533 A | | 11/1999 | Scarlett et al. | |
| 2009/0192654 A1 | * | 7/2009 | Wendte | A01M 7/0057 |
| | | | | 47/58.1 SC |
| 2017/0202127 A1 | * | 7/2017 | Siebers | A01B 3/464 |
| 2020/0288619 A1 | * | 9/2020 | Selvam | E02F 5/14 |
| | | | | 405/181 |

FOREIGN PATENT DOCUMENTS

| | | | |
|---|---|---|---|
| EP | 3403477 A1 | | 11/2018 |
| FR | 2595182 A1 | * | 9/1987 |
| WO | 20180206683 A1 | | 11/2018 |

* cited by examiner

AGRICULTURAL PLOUGH AND METHOD FOR OPERATING

BACKGROUND OF THE INVENTION

The present disclosure relates to an agricultural plough, particularly, but not exclusively, to a plough comprising a plough implement. Other aspects of the present disclosure relate to a method for operating an agricultural plough.

In agriculture, farming cycles are followed that can roughly be divided into the different steps of land preparation, seed sowing, fertilizing, irrigation, crop growth, and harvesting. Each of these steps is critical to yield optimal crop results and achieve the desired returns on initial investments. Of the listed steps, land preparation is typically further divided into steps of, as necessary, clearing obstructions (e.g. bushes, stones and rocks) and subsequent tillage.

Tilling crumbles and loosens the soil, improves the soil structure and incorporates crop residues and manure into the soil, thus fertilizing the ground. The improved soil structure allows for increased plant root growth, soil aeration and water penetration/filtration. Overall this results in higher yields, better long-term soil fertility, soil moisture retention, and weed management. Tillage can be separated into primary (relatively deep) and secondary (relatively shallow) tillage. In primary tillage, such as ploughing, the soil is turned over such that nutrients come to the surface. In addition to turning up the soil to bring fresh nutrients to the top and depositing plant residue below where it will break down, this process also aerates the earth—enabling it to hold more moisture. Preparing the land to a greater depth produces a rougher surface finish than secondary tillage. Secondary tillage (e.g. seedbed cultivation) breaks up soil clods into smaller masses which might be desirable for small seeds or plants that have minimal clod-handling ability.

Primary tillage, and particularly ploughing, is widely regarded as one of the most effective ways of preventing crop disease, removing weeds, and controlling mice and other pests. In its simplest form the turnplough, also known as the mouldboard plough, includes a variety of plough bodies, which are blades for penetrating and turning over the soil in arrays of adjacent trenches, known as furrows. Modern ploughs typically include a plurality of plough bodies connected to a plough frame such that they are laterally offset manner from each other when the plough is in use. Each plough body is connected to the plough frame via corresponding beams. The plough frame, in turn, is connected to a towing or pushing vehicle via a hitch arranged at a front or back end of the frame.

Depending on the density of the soil, a working depth of the plough bodies can be adjusted. For instance, the plough bodies working depth may be shallow in harder (dense) soils, whereas a deeper working depth may be applied in softer (less dense) soils. The plough bodies can be rigidly attached to the main frame, such that their distance from the main frame remains constant. Accordingly, the working depth of the ploughs are then adjusted by varying the ground clearance of the main frame. If the main frame is brought closer to the ground surface, the ground clearance is reduced, and the plough bodies penetrate deeper into the soil. Similarly, if the main frame is lifted further off the ground, the ground clearance is increased, and the plough bodies are raised, thereby reducing the working depth.

The ground clearance of the main frame may, for example, be controlled by one or more depth wheels. The one or more depth wheels may be connected to any part of the main frame such as the rear end of the main frame. An adjustable linkage may be provided between the main frame and the depth wheel to allow for changes in the distance between the depth wheel and the main frame. During ploughing, the depth wheel runs on the ground surface and supports the weight of the plough. If the distance between the depth wheel and the main frame is reduced, then the ground clearance between the main frame and the ground surface reduces accordingly. On the other hand, if the distance between the depth wheel and the main frame is increased, the ground clearance of the main frame increases. As outlined before, changing the main frame's ground clearance results in a variation of the ploughing depth.

Another factor in correctly setting up agricultural ploughs is a lateral adjustment of the plough bodies of the plough implement with respect to the work vehicle, i.e. in a direction perpendicular to the direction of travel. One way of laterally adjusting the plough bodies is by shifting a main frame of the plough implement with respect to the headstock. This may be used to adjust the lateral position of the first plough body of the plough implement to create homogenously aligned furrows.

Lateral adjustment of the plough implement and thus the plough bodies can also be used to change the ploughing width of the plough bodies and the resulting furrow width. To this end, the main frame of a plough implement may be pivoted with respect to the headstock in a horizontal plane (if the ground surface is horizontal) to change an angle of the main frame with respect to the agricultural work vehicle. When pivoting the main frame, the plough bodies are moved simultaneously in a lateral direction and a longitudinal direction with respect to the agricultural vehicle. Pivoting the main frame with respect to the work vehicle will change a lateral extent of the plough implement (e.g. the plough bodies). A lateral adjustment by pivoting thus has an impact on the ploughing width of the plough implement. It follows that the pivoting adjustment may have an impact on energy consumption and/or wear of the plough may be affected.

Adjusting the lateral arrangement of the plough implement with respect to the agricultural work vehicle is, therefore, an important and most challenging task in setting the plough implement up for the ploughing operation.

In view of the above, there is generally a need for an improved way of setting the correct lateral position of the plough implement with respect to the work vehicle.

It is an aim of the present invention to solve or at least ameliorate one or more problems of the prior art.

SUMMARY OF THE INVENTION

Aspects and embodiments of the disclosure provide a method for adjusting a working depth of a plough implement and a plough implement as claimed in the appended claims.

According to a first aspect of the present disclosure, there is provided an agricultural plough arrangement comprising an agricultural work vehicle, a plough implement connected to the agricultural work vehicle and comprising at least one ground engaging tool, at least one actuator mechanism that is configured to move the at least one ground engaging tool laterally with respect to the agricultural work vehicle, and a control unit. The control unit is configured to receive field-data indicative of conditions of a field across which the agricultural plough arrangement is being moved, and automatically determine an actuator-control-signal for the actuator mechanism based on the field-data, wherein the actuator-control-signal is for moving the at least one ground engaging tool laterally with respect to the agricultural work vehicle the basis of the field-data received.

In another embodiment of the agricultural plough arrangement, the control unit is configured to automatically provide the field-data to the at least one actuator mechanism for moving the plough implement laterally with respect to the agricultural work vehicle.

The field-data may comprise one or more of ground-contour-data associated with current or previous ground-contours of the field across which the plough implement is being moved; obstacle-data associated with current or previous obstacle locations within the field across which the plough implement is being moved; and soil-density data associated with current or previous density of soil within the field across which the plough implement is being moved.

The ground-contour-data may comprise lateral-contour-data that is representative of lateral contours of the field across which the plough implement is being moved.

The lateral-contour-data may comprise averaged contour data, that is averaged over the width of the plough implement.

A plurality of candidate-field-data may be stored in a database and automatically determining the actuator-control-signal may include: receiving location data of the plough implement within the field; and using the location data to select one of the candidate-field-data as the field-data.

The control unit may be configured to retrieve and/or calculate a desired lateral arrangement of the plough implement with respect to the agricultural vehicle on the basis of the field-data.

In another embodiment, the control unit is configured to determine a current lateral arrangement of the plough implement with respect to the agricultural vehicle and compare the current lateral arrangement to a desired lateral arrangement, and wherein the control unit is configured to set the actuator-control signal to cause a lateral adjustment of the plough implement with respect to the agricultural work vehicle if a difference between the current and the desired lateral arrangement exceeds or falls below a predetermined threshold value.

The control unit may be configured to set the actuator-control-signal such that the plough implement is moved up a slope, relative to the agricultural work vehicle, if the agricultural plough arrangement is moved across the slope.

The control unit may be configured to set the actuator-control-signal such that the plough implement is moved laterally away from an obstacle that is being approached by the agricultural plough arrangement.

According to another embodiment, the actuator mechanism includes one or more of: a lateral sliding mechanism that is configured to laterally shift the plough implement with respect to the agricultural work vehicle; and a plough width adjustment mechanism that is configured to yaw a main frame of the plough implement. The lateral sliding mechanism may be driven by a hydraulic cylinder. Alternatively, the lateral sliding mechanism may be driven by a rotary motor with rack and gear, steel wires, or a lead screw arrangement. When using a rotary motor, the rack and gear, steel wires or the lead screw arrangement may be connected to a telescopic housing, such as a telescopic cylinder or square tube for moving the sliding mechanism. Similarly, the plough width adjustment mechanism may be driven by either a hydraulic cylinder or a rotary motor.

The at least one actuator mechanism may be configured to move a main frame of the plough implement laterally with respect to the agricultural work vehicle.

According to another aspect of the present disclosure, there is provided a computer-implemented method of operating an agricultural plough arrangement, the agricultural plough arrangement comprising an agricultural work vehicle; a plough implement connected to the agricultural work vehicle and comprising at least one ground engaging tool; and at least one actuator mechanism that is configured to move the plough implement laterally with respect to the agricultural work vehicle, wherein the method comprises: receiving field-data indicative of conditions of a field across which the agricultural plough arrangement is being moved; automatically determining an actuator-control-signal for the actuator mechanism based on the field-data, wherein the actuator-control-signal is for moving the plough implement laterally with respect to the agricultural work vehicle on the basis of the field-data received.

The actuator-control-signal may be for moving the plough implement laterally with respect to the agricultural work vehicle such that the plough implement is moved up a slope, relative to the agricultural vehicle, if the agricultural plough arrangement is moved across the slope.

In yet another aspect of the present disclosure, there is provided a computer program configured to perform the above method or to configure the above control unit. When run on a computer, the computer program causes the computer to configure any apparatus, including the control unit, disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software may be an assembly program.

The computer program may be provided on a computer readable medium, which may be a physical computer readable medium such as a disc or a memory device, or may be embodied as a transient signal. Such a transient signal may be a network download, including an internet download.

The agricultural work vehicle and/or the agricultural implement may be remote controlled, e.g. from a farm office. Accordingly, the agricultural work vehicle may include one or more communication interfaces for connection to a remote processor and/or a remote controller. Similarly, the agricultural implement may include one or more communication interfaces for connection to a remote processor and/or a remote controller.

Within the scope of this application it is expressly intended that the various aspects, embodiments, examples and alternatives set out in the preceding paragraphs, and the claims and/or the following description and drawings, and in particular the individual features thereof, may be taken independently or in any combination. That is, all embodiments and all features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the present disclosure will now be described by way of example only, with reference to the accompanying drawings, in which.

DETAILED DESCRIPTION OF THE DRAWINGS

Figure 1A:
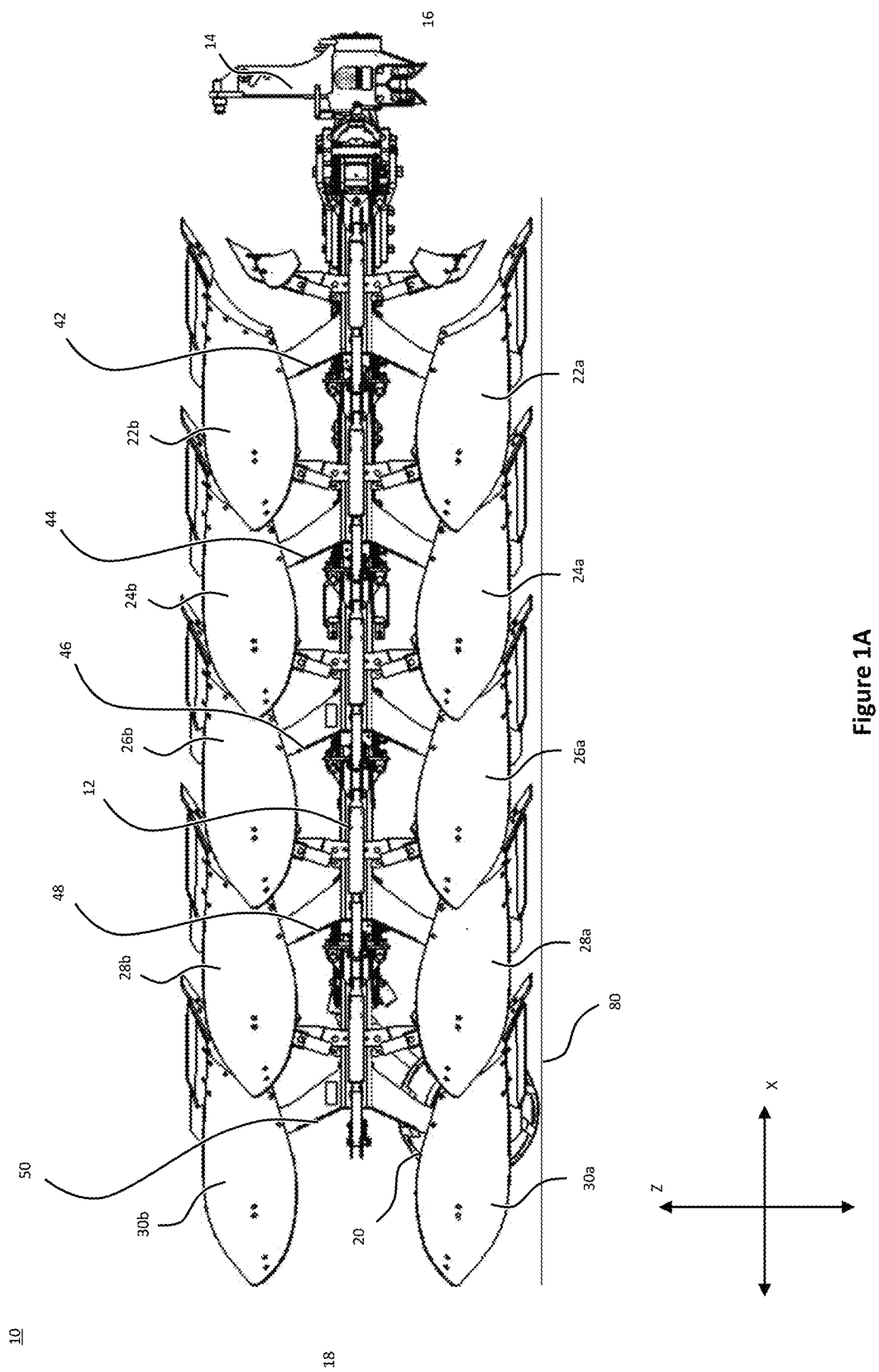
FIG. 1A shows a right-side view of an agricultural implement with fixed ground engaging tools.
Figure 1B:
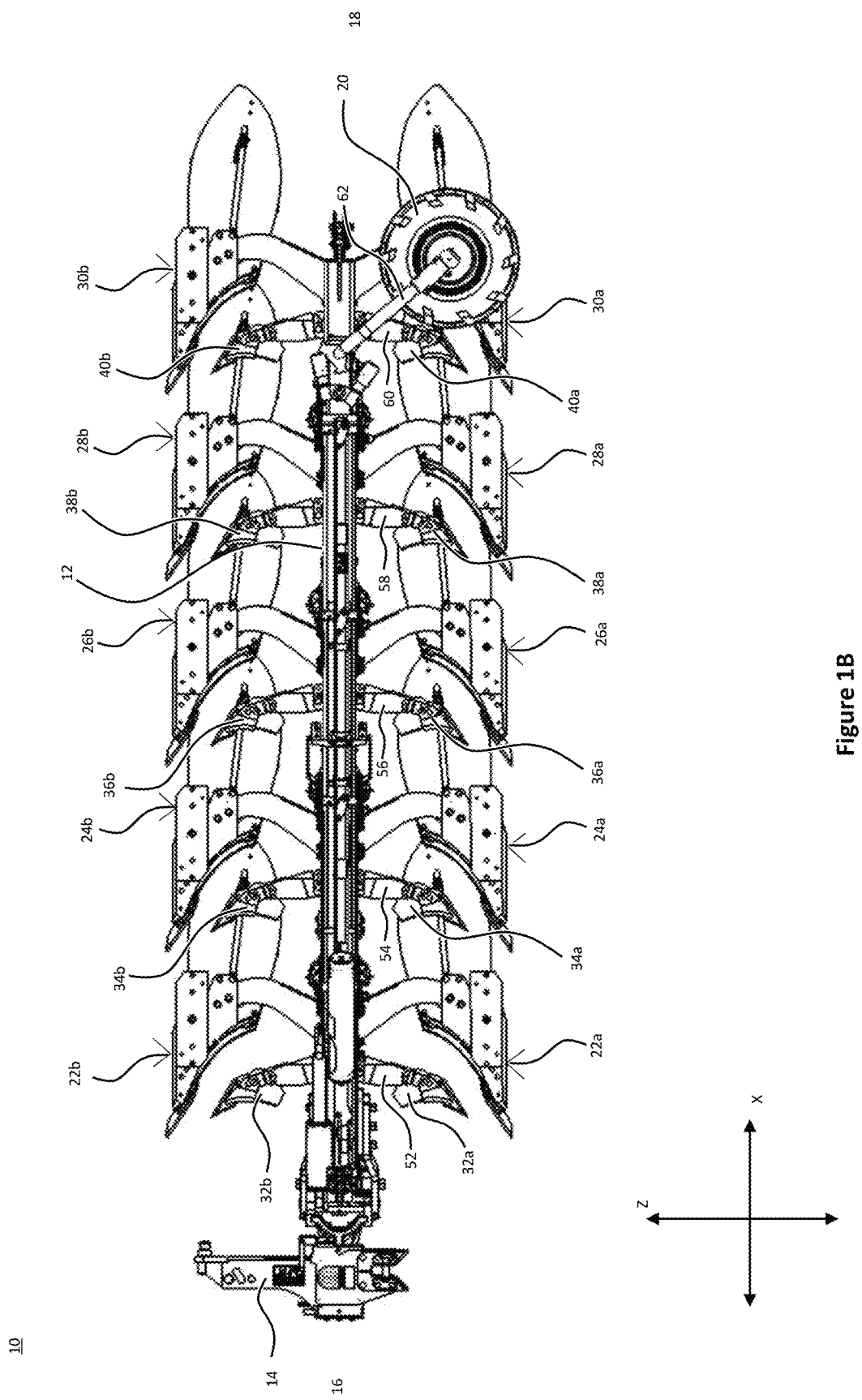
FIG. 1B shows a left-side view of the agricultural implement shown in FIG. 1A.
Figure 1C:
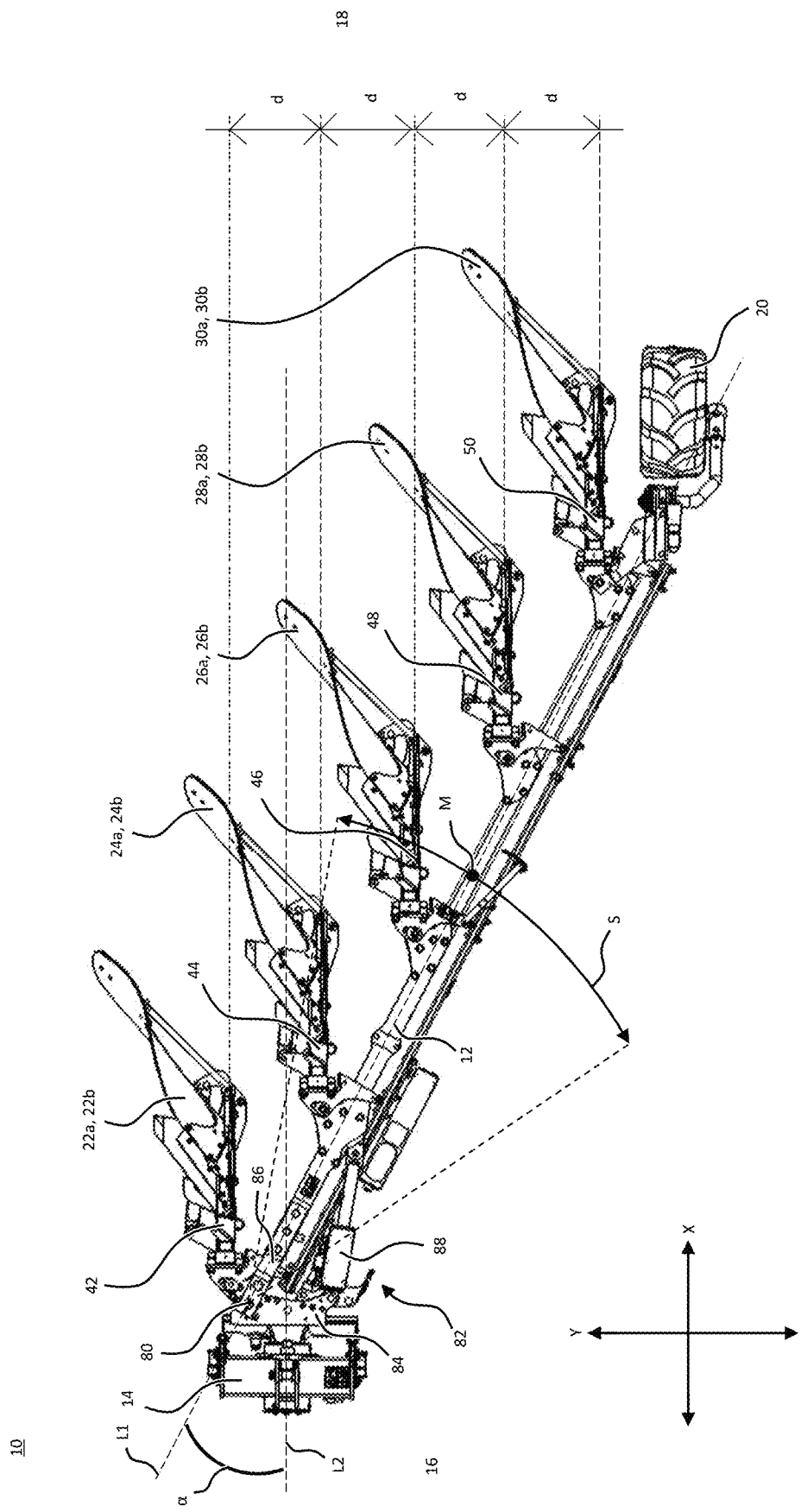
FIG. 1C shows a plan view of the agricultural implement shown in FIG. 1A.

FIGS. 1A to 1C show various views of an agricultural implement, particularly a plough implement 10. As will be described in more detail below, the plough implement 10 shown in FIGS. 1A to 1C is a reversible plough.

In the following, the term "longitudinal direction" shall refer to direction X shown in FIGS. 1A to 1C. In normal conditions, the "longitudinal direction" is aligned with a direction of travel of the agricultural plough implement 10. The term "lateral direction" shall refer to direction Y shown in FIGS. 1C and 3. The lateral direction Y is perpendicular to the "longitudinal direction" X. The term "vertical direction" shall refer to direction Z shown in FIGS. 1A and 1B. The "vertical direction" Z is perpendicular to the "longitudinal direction" X and the "lateral direction" Y.

The plough implement 10 comprises a main frame 12. The main frame 12 may be a rectangular or round tube extending between a headstock 14 at a front end 16 of the plough towards a plough wheel 20 at a rear end 18 of the plough. The main frame 12 supports a variety of ground-engaging tools.

In the example of FIGS. 1A to 1C, the ground engaging tools include plough bodies 22a, 22b, 24a, 24b, 26a, 26b, 28a, 28b, 30a, 30b and plough skimmers 32a, 32b, 34a, 34b, 36a, 36b, 38a, 38b, 40a, 40b. A plurality of first ground engaging tools, i.e. plough bodies 22a, 24a, 26a, 28a, 30a and skimmers 32a, 34a, 36a, 38a, and 40a, are arranged on a first side of the main frame 12. In a first configuration of the main frame 12, illustrated in FIGS. 1A to 1C, the plurality of first ground engaging tools are arranged below the main frame 12.

A plurality of second ground engaging tools, i.e. plough bodies 22b, 24b, 26b, 28b, 30b and skimmers 32b, 34b, 36b, 38b, and 40b, are arranged on a second side of the main frame 12, opposite to the plurality of first ground engaging tools. In the first configuration of the main frame 12, illustrated in FIGS. 1A to 1C, the plurality of second ground engaging tools are arranged above the main frame.

Each of the plough bodies 22a, 22b, 24a, 24b, 26a, 26b, 28a, 28b, 30a, 30b is connected to the main frame 12 by means of beams 42, 44, 46, 48, 50. Each of the beams 42, 44, 46, 48, 50 has a substantially Y-shaped structure.

A first beam 42 supports a first pair of plough bodies 22a, 22b. A second beam 44 supports a second pair of plough bodies 24a, 24b. A third beam 46 supports a third pair of plough bodies 26a, 26b. A fourth beam 48 supports a fourth pair of plough bodies 28a, 28b. A fifth beam 50 supports a fifth pair of plough bodies 30a, 30b.

Each of the pairs of plough bodies 22a, 22b, 24a, 24b, 26a, 26b, 28a, 28b, 30a, 30b is designed to create a furrow in the field when the plough is dragged behind or pushed by an agricultural work vehicle such as a tractor. It follows that each run of the illustrated plough implement 10 through a field creates five adjacent furrows.

A first mounting rail 52 supports a first pair of skimmers 32a, 32b. A second mounting rail 54 supports a second pair of skimmers 34a, 34b. A third mounting rail 56 supports a third pair of skimmers 36a, 36b. A fourth mounting rail 58 supports a fourth pair of skimmers 38a, 38b. A fifth mounting rail 60 supports a fifth pair of plough bodies 40a, 40b. The skimmers 32a, 32b, 34a, 34b, 36a, 36b, 38a, 38b, 40a, 40b and/or their respective mounting rails may be adjustable with respect to the main frame 12 to change the distance between the skimmers 32a, 32b, 34a, 34b, 36a, 36b, 38a, 38b, 40a, 40b and the main frame. In one example, the skimmers 32a, 32b, 34a, 34b, 36a, 36b, 38a, 38b, 40a, 40b may be movable up and down towards and away from the main frame 12 to individually adjust the working depth of each of skimmers. The skimmers 32a, 32b, 34a, 34b, 36a, 36b, 38a, 38b, 40a, 40b may either be manually or automatically adjustable.

Figure 2:
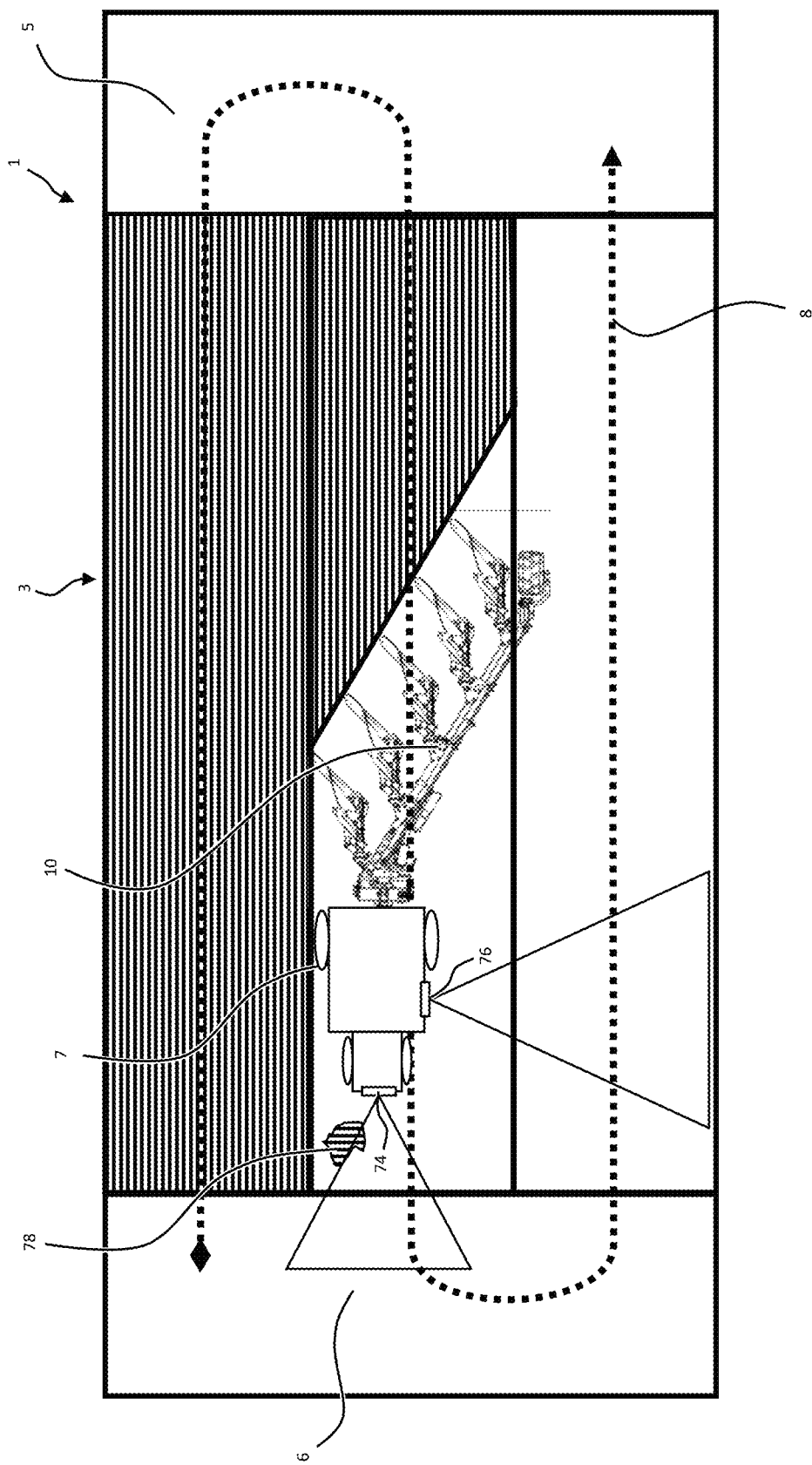
FIG. 2 shows a schematic representation of the trajectory of an agricultural machinery within a work area.

Turning to FIG. 2, a typical operation of an agricultural machinery comprising a tractor 7 and a plough implement 10 is described. In use, the plough implement 10 is drawn as an attachment (implement) behind an agricultural towing vehicle (e.g. tractor 7). It will be appreciated that it is equivalently feasible to locate the plough implement 10 in front of or both in front of and behind the tractor 7.

FIG. 2 shows a schematic work area 1, e.g. a crop field, which is divided into a main field 3 and headlands 5,6. A tractor 7 draws the plough implement 10 across the main field 3 in generally parallel working rows. The working rows are part of the trajectory 8 of the tractor 7 and typically run in parallel with a long edge of the work area 1. Each working row represents an individual run of the agricultural machinery across the field between headlands 5 and 6. As will be described in more detail below, a five-furrow plough, such as the exemplary plough shown in FIGS. 1A to 1C creates a total of five furrows per run.

At the end of each run/working row, the tractor 7 and plough implement 10 use the upcoming headland 5 or 6 for turning around, as indicated by trajectory 8. It is known in the art that the soil of the headlands 5, 6 is subject to greater levels of soil compaction as it receives more traffic per unit area than the main field 3. In order not to disturb the soil of the headlands 5, 6 more than necessary, it is known to lift the ground engaging tools, such as the plough bodies and the skimmers, off the ground into a headland or transfer position, just before the plough implement 10 reaches the headlands 5 or 6 respectively. Once the tractor 7 and the corresponding plough implement 10 have turned on the headland 5, 6, the ground engaging tools of the plough implement 10 are, again, lowered towards an operating position to engage the soil of the main field 3.

In the illustration of FIG. 2, the plough implement 10 is working on the main field 3 and, therefore, is arranged in the operating position. As the plough implement 10 reaches the border between the headland 5/6 and the main field 3, the plough implement 10 is transferred to a headland/transfer position. It follows that each working row starts with an adjustment of the plough from the transfer position into the operating position and ends with an adjustment of the plough from the operating position into the transfer position.

The plough implement 10 shown in FIGS. 1A to 1C is of the fully-mounted type. In fully-mounted ploughs, the weight of the plough is carried exclusively by the tractor when the plough is in its transfer position (on the headlands). In other words, the plough is then exclusively supported by the tractor 7 via headstock 14 and may be lifted off the ground with a lift cylinder of a tractor linkage.

During the turning movement on the headlands, the plough implement 10 is also reversed. That is, the main frame 12 is rotated by about 180 degrees with respect to the headstock 14 to move the plough from a first configuration to a second configuration. It will be appreciated that if the operator is ploughing in the furrow, then the main frame 12 may not be rotated by exactly 180 degrees, it is more likely to be 190-200 degrees or 160-170 degrees depending on which direction the main frame 12 turns. If the operator is ploughing on-land, then the main frame 12 may be rotated by an angle that is closer to 180 degrees, perhaps exactly 180 degrees. That is, the main frame 12 is rotated by around 180 degrees with respect to the headstock 14 to move the plough from a first configuration to a second configuration.

In its first configuration shown in FIGS. 1A to 1C, the plough implement 10 is set up such that the plurality of first ground engaging tools, i.e. plough bodies 22a, 24a, 26a, 28a, and 30a and skimmers 32a, 34a, 36a, 38a, 40a, of each of the pairs are in contact with the soil. This first configuration is shown in FIG. 2 and sometimes also referred to as the "left side configuration", since most of the plough bodies are arranged to the left of tractor 7. In its second configuration (not illustrated), the plough implement 10 is set up such that the plurality of second ground engaging tools, i.e. plough bodies 22b, 24b, 26b, 28b, 30b and skimmers 32b, 34b, 36b, 38b, 40b, are in contact with the soil. This second configuration is achieved after rotating the main frame by 180 degrees, such that the majority of plough bodies are then located to the right of the tractor (not shown). The second configuration is, therefore, also sometimes referred to as the "right side configuration".

Tilling the field with the plough implement 10 in this first configuration provides a first furrow created by the first plough body 22a, a second furrow created by the second plough body 24a, a third furrow created by the third plough body 26a, a fourth furrow created by the fourth plough body 28a, and a fifth furrow created by the fifth plough body 30a. A furrow width is determined by the lateral distance d between the plough bodies 22a, 22b, 24a, 24b, 26a, 26b, 28a, 28b, 30a, 30b, as illustrated in FIG. 1C.

As the reversible plough implement 10 reaches the end of the first run, the main frame 12 is rotated by 180 degrees (reversed) with respect to the headstock 14. A turning cylinder (not shown), attached to the headstock 14 may be used to rotate (reverse) the plough implement 10. During rotation of the main frame, the first plurality of plough bodies, e.g. 22a, 24a, 26a, 28a, 30a, are transferred to the top of the plough implement 10. At the same time, the second plurality of plough bodies e.g. 22b, 24b, 26b, 28b, 30b, which were not in use in the previous run, is then transferred to the lower end of the plough implement 10 and will be submerged in the soil during the next run. The reversible plough is then in its second configuration (not shown).

Executing a second run of the field with the plough implement 10 in this second configuration provides a first furrow created by the sixth plough body 22b, a second furrow created by the seventh plough body 24b, a third furrow created by the eighth plough body 26b, a fourth furrow created by the ninth plough body 28b, and a fifth furrow created by the tenth plough body 30b.

Reversing the plough implement 10 between consecutive runs has the advantage that the plough bodies 22a, 22b, 24a, 24b, 26a, 26b, 28a, 28b, 30a, 30b that engage the soil always face the same side edge of the main field 3, irrespective of the tractor's orientation.

In both configurations of the plough implement 10 the main frame 12 is supported by an implement wheel 20. The implement wheel 20 is arranged at the back end 18 of the plough implement 10. Since the plough bodies 22a, 22b, 24a, 24b, 26a, 26b, 28a, 28b, 30a, 30b and the skimmers 32a, 32b, 34a, 34b, 36a, 36b, 38a, 38b, 40a, 40b are generally fixed to the main frame via beams 42, 44 46, 48 and 50, there is no possibility of adjusting the working depth of said ground engaging tools without changing the ground clearance of the main frame 12. To this end, the plough 10 shown in FIGS. 1A to 1C includes implement wheel 20, which acts as a depth wheel to adjust the ground clearance of the main frame 12. A linkage 62 provided between the implement wheel 20 and the main frame 12 allows the operator to lift or lower the main frame 12 with respect to a ground surface 80. The linkage 62 may be connected to an actuator, e.g. a hydraulic cylinder (not shown), for adjusting the distance between the implement wheel 20 and the main frame, thereby lifting and lowering the main frame. The linkage 62 and the actuator together form a depth adjustment apparatus for the plough bodies 22a, 22b, 24a, 24b, 26a, 26b, 28a, 28b, 30a, 30b and the skimmers 32a, 32b, 34a, 34b, 36a, 36b, 38a, 38b, 40a, 40b. Since the position of the plurality of first and second ground engaging tools is fixed with respect to the main frame 12, any change in the main frame's ground clearance will also affect the working depth of the plurality first and second ground engaging tools. In particular, if the main frame 12 is lowered by shortening the linkage 62 between implement wheel 20 and the main frame 12, then the working depth of the plurality of first ground engaging tools shown in FIGS. 1A to 1C is increased, i.e. the plurality of first ground engaging tools are lowered further into/towards the soil. If, on the other hand, the main frame 12 is lifted, by extending the linkage 62 between implement wheel 20 and the main frame 12, then the working depth of the plurality of first ground engaging tools is decreased, i.e. the plurality of first ground engagement tools are raised.

Referring back to FIG. 1C, it will be appreciated that the distance d between the plough bodies 22a/22b, 24a/24b, 26a/26b, 28a/28b, and 30a/30b is adjustable. In the embodiment of the plough implement 10 shown in FIGS. 1A to 1C, the lateral distance d is adjustable by pivoting the main frame 12 in a horizontal plane, such as in the plane shown in FIG. 1C. In other words, the main frame 12 is connected to the headstock 14 via a pivot 80. The main frame 12 may rotate about a pivot 80 with respect to headstock 14 and thus also with respect to an agricultural work vehicle (not shown) that is connected to the headstock 14.

In a normal operation, a longitudinal axis L1 of the main frame 12 is arranged at an angle $\alpha$ with respect to a longitudinal axis L2 of a corresponding agricultural work vehicle. It will be appreciated that the angle $\alpha$ between the longitudinal axis L1 of the main frame 12 and the longitudinal axis L2 of the agricultural work vehicle may be changed by pivoting the main frame about the pivot 80. A plough width adjustment mechanism 82 comprises the pivot 80, link plate 84, a front part 86 of the main frame 12 and a width adjustment actuator 88. The width adjustment actuator 88 in this embodiment is a hydraulic cylinder. By retracting the width adjustment actuator 88, the front part 86 of the main frame 12 will be drawn closer towards the link plate 84, thereby increasing the angle α between the longitudinal axis L1 of the main frame 12 and the longitudinal axis L2 of the agricultural work vehicle. As the angle α between the longitudinal axes L1, L2 is increased, so is the lateral distance d between the neighbouring plough bodies 22a to 30b. Similarly, if the actuator 88 is extended, the main frame 12 is pivoted counter-clockwise in FIG. 1C about the pivot 80, thereby decreasing the angle α between the longitudinal axis L1 of the main frame 12 and the longitudinal axis L2 of the agricultural work vehicle. As the angle α between the longitudinal axis L1 and L2 is decreased, the lateral distance d between the neighbouring plough bodies 22a through to 30b decreases.

Although this is not specifically represented in FIG. 1C, it will also be appreciated that as the angle α between the axes L1, L2 is increased, a lateral arrangement of the main frame and the plough bodies 22a to 30b with respect to the agricultural work vehicle (not shown) changes. This is because, as the angle α is manipulated, the centre M of the plough implement is moved along circular segment S. Accordingly, as the angle α is increased, the centre M of the plough implement 10 is moved towards the bottom of FIG. 10. Similarly, if the angle α is decreased, the centre M of the plough implement 10 moves towards the top end of FIG. 1C.

Figure 3:
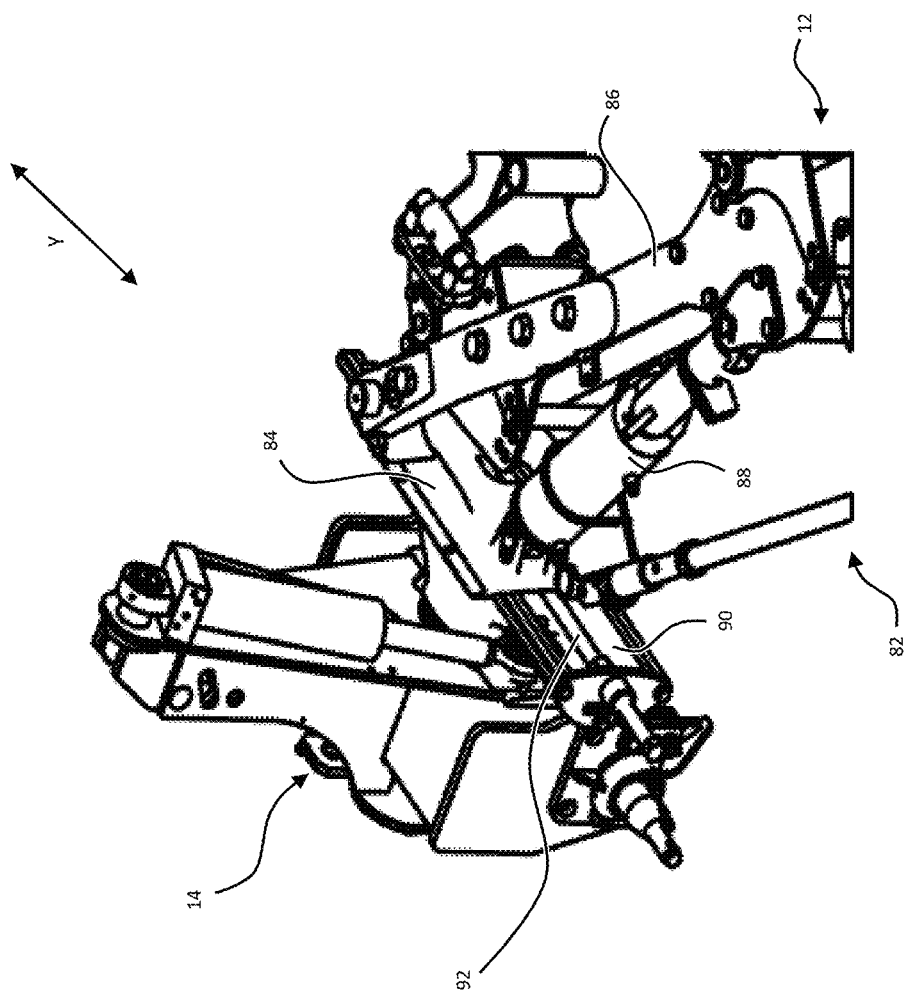
FIG. 3 shows a schematic representation of a headstock region of an agricultural plough implement.

A lateral adjustment of the plough bodies with respect to the agricultural work vehicle may also be possible without changing the angle α between the main frame 12 and the agricultural work vehicle. In the embodiment of the plough implement 10 shown in FIGS. 1A to 1C, the headstock 14 may include a sliding mechanism that allows for lateral movement of the main frame 12 with respect to the headstock 14 and, therefore, with respect to the agricultural work vehicle. One embodiment of the sliding mechanism is shown in FIG. 3 for example. The headstock 14 and parts of the plough width adjustment mechanism 82 are shown in greater detail in FIG. 3. As illustrated, headstock 14 includes a slide guide 90 which allows link 84 to slide in a lateral direction Y with respect to the headstock 14. The sliding movement of the link 84 results in a lateral movement of the entire main frame 12 and the corresponding parts (e.g. the plough bodies) attached to the main frame 12.

The sliding movement of the link 84 and therefore the main frame 12 with respect to the headstock 14 in the lateral direction Y in FIG. 3 is achieved by means of a lead screw mechanism 92. Rotation of the lead screw 92 will cause the first link 84 to slide with respect to the slide guide 90 in the lateral direction Y. The lead screw 92 may be rotated by means of an electric motor (not shown). In alternative embodiments, the lead screw 92 may be replaced by alternative actuator mechanisms, such as mechanisms including hydraulic or pneumatic cylinders to slide the main frame 12 with respect to the headstock 14 in the lateral direction thereby adjusting the lateral arrangement of the plough bodies and the plough implement 10 in general with respect to the agricultural work vehicle (not shown).

From the above, it will be understood that the lateral arrangement of the plough implement 10 with respect to the agricultural vehicle may be changed in a variety of ways, two of which have been set out above. It should also be noted that a lateral adjustment of the plough implement 10 with respect to the agricultural work vehicle 7 does not require a lateral movement of every part of the plough implement 10 in a lateral direction. Rather, a lateral adjustment of the plough implement may be achieved by simply changing the lateral position of one or more ground engaging tools, such as the plough bodies, of the plough implement.

Figure 4:
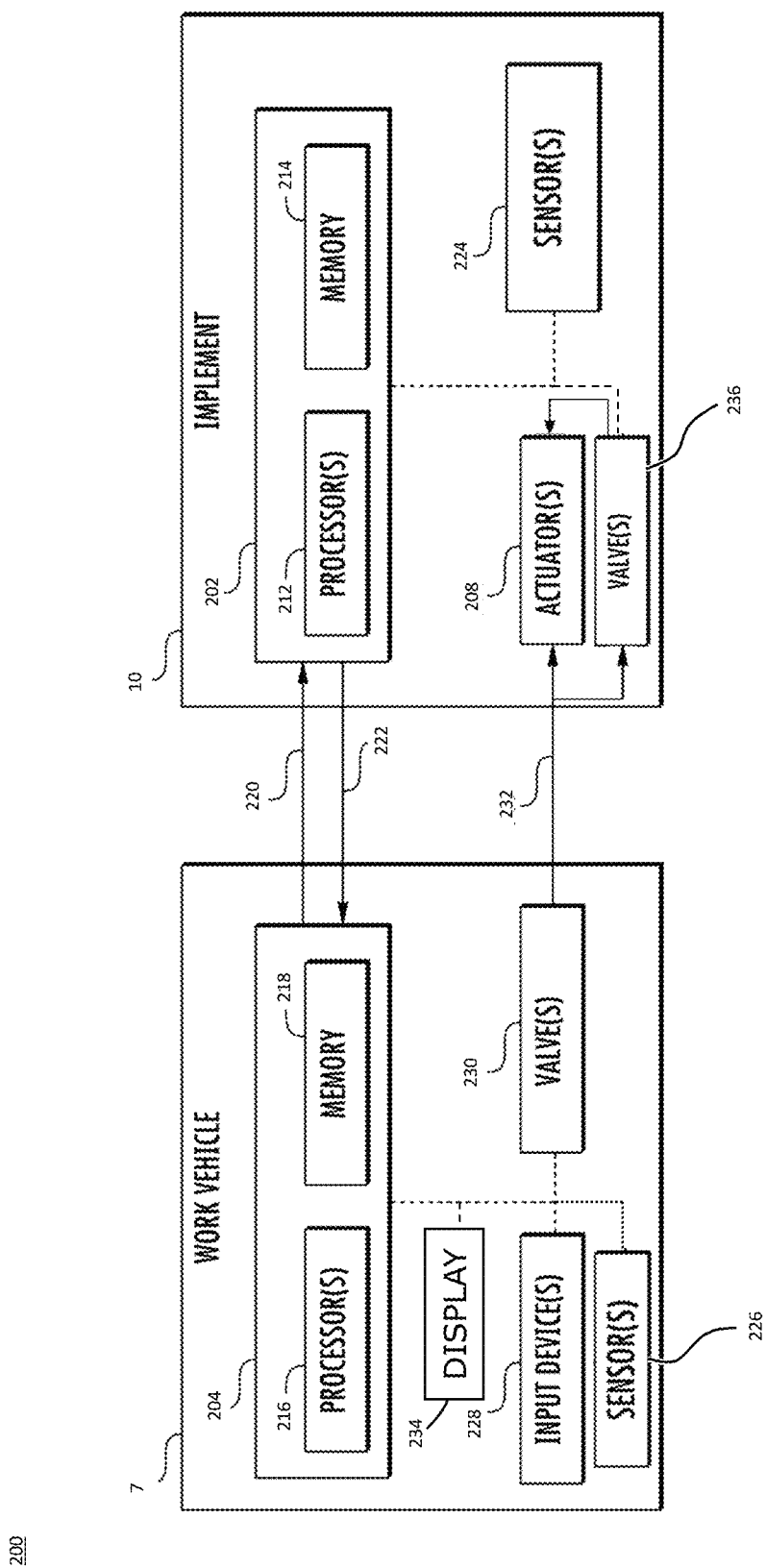
FIG. 4 shows a schematic representation of a system for adjusting the lateral position of a plough implement with respect to an agricultural work vehicle.

Referring to FIG. 4, there is shown a schematic view of an embodiment of a system 200 for adjusting the lateral arrangement of a at least one plough body of the plough implement 10 with respect to the agricultural work vehicle 7. The system 200 may include a control unit 202 installed on and/or otherwise provided in connection with the plough implement 10. In some embodiments, the system may additionally or alternatively include a control unit 204 which is associated with the agricultural work vehicle 7, such as a towing vehicle (e.g. a tractor). Either the control unit 202 associated with the plough implement 10 and/or the control unit 204 associated with the work vehicle 7 may be capable of electronically controlling the operation of one or more components of the plough implement, such as by electronically controlling the operation of one or more ground engaging tools via corresponding actuators 208. Similarly, either the control unit 202 of the implement or the control unit 204 of the agricultural work vehicle 7 may be capable of controlling operation of one or more components of the agricultural work vehicle 7.

The control unit 202 associated with the plough implement 10 may include one or more processors 212 associated with one or more memory devices 214. Similarly, the control unit 204 associated with the agricultural work vehicle 7 may also include one or more processors 216 connected to one or more memory devices 218. The control unit 202 of the plough implement 10 and the control unit 204 of the agricultural work vehicle 7 may communicate with each other as indicated by arrows 220, 222. For example, the control unit 202 of the implement may communicate live field-data detected by implement sensors 224 to the control unit 204 of the work vehicle. Similarly, the control unit 204 of the agricultural work vehicle 7 may communicate with control unit 202 of the implement via communication line 220 to forward data determined by work vehicle sensors 226 or forward direct commands of the operator entered via one or more input devices 228. The control unit 204 of the agricultural work vehicle 7 may also be connected to one or more valves 230, such as hydraulic valves. The valves 230 may be part of a hydraulic system (not shown) located on the agricultural work vehicle 7. By controlling the valves 230, the control unit 204 may control a hydraulic fluid supply from the hydraulic system towards actuators 208 of the plough implement 10, via fluid lines 232. Similarly, one or more valves 236 may be located on the plough implement 10 to control one or more actuators of the plough implement 10. Again, the valves 236 may be controlled by the control unit 202 of the plough implement 10 and/or the control unit 204 of the work vehicle 7. It should be appreciated that generally only a single control unit 202 or 204 may be required to control both the plough implement 10 and the agricultural work vehicle 7 together with their corresponding hardware. The control unit(s) may also be located remotely from both the agricultural work vehicle 7 and the plough implement 10.

The one or more actuators 208 may be part of one or more actuator mechanism(s) that is(are) configured to move parts of the plough implement 10 laterally with respect to the agricultural work vehicle 7. In one example, the one or more actuators 208 may correspond to the hydraulic actuator 88 associated with the plough width adjustment mechanism described in connection with FIG. 1C. Alternatively, the one or more actuators 208 may correspond to an actuator of the lateral sliding mechanism shown in FIG. 3. Accordingly, the actuators 208 may be used to change the plough implement's lateral position with respect to the agricultural work vehicle 7 depending on an actuator-control-signal received from either one of the control units 202, 204.

The control unit 202 of the implement and/or the control unit 204 of the agricultural work vehicle 7 are capable of automatically controlling an operation of an actuator mechanism that is configured to move parts (e.g. the main frame and/or one or more plough bodies) of the plough implement laterally with respect to the agricultural work vehicle. In this specification, the term "automatically controlling" refers to the ability of the control units 202 and/or 204 to adjust the lateral position of parts of the plough implement 10 independent of an operators' input. Rather, control units 202, 204 are configured to receive field-data indicative of a field condition of a field across which the plough implement 10 is being moved. The field-data received by the control unit 202 of the plough implement 10 and/or the control unit 204 of the agricultural work vehicle 7 may be provided by various sources.

In one embodiment, one or more sensors 224 of the plough implement 10 and/or one or more sensors 226 of the work vehicle 7 may be used to determine live field-data associated with the field condition of the field across which the plough implement 10 is being moved. To this end, the sensors 224, 226 may include a variety of different sensor types for determining various data associated with the field condition.

In one example shown in FIG. 2, the sensors 226 of the agricultural work vehicle 7 include optical sensors 74 and 76. A first optical sensor 74 may be connected to a front end of the work vehicle 7. The first sensor 74 may be used to determine the field conditions ahead of the agricultural work vehicle 7. For example, the first sensor 74 may be able to determine the contours of the field in front of the agricultural work vehicle and, therefore, also in front of the plough implement 10. The first sensor 74 may also be able to determine field-data that is indicative of obstacles 78 in front of the plough implement 10. The first optical sensor 74 may provide such field-data relating to the field condition in front of the working vehicle 7 to one or both of the control units 202, 204.

A second optical sensor 76 may be arranged on a side of the agricultural work vehicle 7 or, alternatively, on a side of the plough implement 10. The second optical sensor 76 may be used to determine field-data indicative of the field conditions on the next working row. Such field-data may be indicative of the contours of the field on the next working row or obstacles along the next working row (e.g. rocks) that need to be avoided by the ground engaging tools of the plough implement 10.

Of course, optical sensors, such as RGB, NIR and/or IR sensors, may also be arranged on the agricultural implement. Optical sensors 74, 76 are merely two specific examples of sensors that may be used to determine live field-data that is fed back to one or both of the control units 202, 204. Other sensors may include:

humidity sensors for determining a humidity parameter indicative of the moisture content of the soil;

resistance sensors for determining parameters indicative of soil density levels of the soil;

temperature sensors for determining the temperature of the soil;

level sensors for determining the parameters indicative of the contours of the field ultra-sonic or radar sensors (e.g. LIDAR) for determining subterranean obstacles or other characteristics of the soil.

Most of the above sensors may either be attached to the agricultural work vehicle 7 or the plough implement 10 or even part of a separate device, such as a different agricultural work vehicle or a drone scanning the work area in front of or behind the agricultural work vehicle 7 and the plough implement 10.

Further examples include sensors that determine implement data indicative of the operation of the plough implement such as:

a location sensor for continuously or periodically determining the position of the plough implement 10 within the field, a parameter which may be used to determine the speed of the plough implement 10 and/or the associated agricultural work vehicle 7;

a speed sensor directly determining the speed of the plough implement 10 and/or the associated agricultural work vehicle 7;

a force sensor to determine a drag/resistance experienced by the plough implement 10 or the at least one ground engaging tool;

a wheel slip sensor for determining a parameter indicative of the wheel slip experienced by a wheel 20 of the plough implement 10 and/or a wheel of the associated agricultural work vehicle 7.

Each of the sensors described above may be directly or indirectly connected to one or both of the control units 202 and 204 associated with the plough implement 10 and/or the work vehicle 7. The sensors supply the control units 202, 204 with data including the live field-data and implement data discussed above.

The work vehicle 7 of the system 200 shown in FIG. 4 may also include a display 234 to provide feedback to the operator. The display 234 may be used to illustrate the current lateral position of the plough implement 10. According to other embodiments, the control units 202, 204 may also display intended lateral position changes during the ploughing operation on the display 234. The operator may have the option to override any intended change of the lateral position of the plough implement via input devices 228. Yet, it will be appreciated that the operator's input is generally not required for the system 200 to change the lateral position of any part of the plough implement 10.

On the basis of the data provided by the sensors, the control units 202, 204 may retrieve or calculate a desired lateral arrangement of the plough implement 10 (or parts thereof) with respect to the agricultural work vehicle 7. To this end, the respective memories 214, 218 of control units 202, 204 may include a look-up table and/or database with an array of lateral positions of parts of the plough implement 10 linked to different field-data that may be received from the sensors 224, 226 described above. Alternatively, or additionally, the memories 214, 218 may include a predetermined algorithm for calculating a desired lateral arrangement on the basis of the field-data. Such predetermined algorithms may then be applied to the field-data received by the respective processors 212, 216. Non-exclusive examples of field-data received by the control unit(s) 202, 204 are set out below:

ground-contour-data associated with current or previous ground-contours of the field across which the plough implement is being moved;

obstacle-data associated with current or previous obstacle locations within the field across which the plough implement is being moved;

soil-density data associated with current or previous density of soil within the field across which the plough implement is being moved.

More specific examples of the ground-contour-data are set out below:

Sloped ground surfaces, whether inclines or declines in either a longitudinal direction or a lateral direction of the plough could be detected by a sensor on the agricultural work vehicle and/or the plough implement and provided as current (or live) ground-contour-data, which is acquired during the operation of the agricultural plough. Other examples of current ground-contour-data include data determined by a level sensor on either the agricultural work vehicle or the plough implement. The level sensor may provide information about the slope of the ground surface across which the agricultural plough is being moved. The parameters determined by the level sensor are then fed back to the control unit as current ground-contour-data.

Rather than determining the ground-contour-data during the operation of the agricultural plough (current or live ground-contour-data), it is also feasible to use previous (or predetermined) ground-contours stored in a memory accessible by the control unit of either the agricultural vehicle or the plough implement. Such previous ground-contour-data can be determined before the ploughing operation is started, e.g. by means of satellite images, other agricultural machinery, or even drones. Alternatively, previous ground-contour-data may be acquired in previous runs of the same field with the agricultural plough, such as ploughing operations performed in previous years. The previous ground-contour-data of the field may comprise substantially the same parameters as the current (live) ground-contour-data, e.g. as slopes, ridges and troughs on the field.

Obstacle-data may provide the location of obstacles within the field determined as current/live data by sensors on the agricultural work vehicle and/or the plough implement. One example of such sensors is described with reference to FIG. 2 and provides live updates of obstacles in front of the plough implement. Obstacles may refer to any part of the field that should not be passed by parts of or the entire plough implement. One example of obstacle-data may be the location of a rock within the soil that should not be encountered by any of the plough bodies of the plough implement.

Similar to the previous ground-contours described above, previously identified obstacle locations may be used as the previous obstacle-data provided to the control unit. Accordingly, previous obstacle-data may refer to obstacle-data that is determined before the ploughing operation is commenced, either by suitable sensors or during previous runs of the same field.

Soil-density data may include parameters associated with the current or previous density of the soil within the field. Such parameters may be the compaction levels of the soil and/or the moisture content of the soil in question.

Non-exclusive examples of actuator-control signals determined by the control unit based on some of the field-data examples outlined before are set out below:

If the agricultural plough moves across a lateral slope, the control unit may set the actuator-control signal such that parts of the plough implement is moved up the slope, relative to the agricultural work vehicle. In this regard, moving "across the slope" refers to a movement of the agricultural plough that is not exclusively up and down a slope. Rather it refers to any movement of the plough along/transverse to the slope.

In one example, the actuator-control-signal may cause the control unit to extend or retract actuator 88 (FIG. 1C) in such a way that the main frame 12 of the agricultural implement 10 is pivoted uphill. In other words, the centre M of the main frame 12 will be moved laterally uphill against the force of gravity.

In another example, the control unit may create an actuator-control-signal that results in a sliding movement of the lateral sliding mechanism shown in FIG. 3, such that the main frame is laterally shifted uphill.

The control unit may determine an actuator-control-signal that shifts or pivots the main frame laterally to avoid collision with an obstacle determined by the field-data. In the illustration of FIG. 2, the obstacle 78 may be avoided by shifting the main frame 12 of the plough implement 10 towards the bottom in FIG. 2. This lateral adjustment of the main frame may either be achieved by the lateral sliding mechanism of FIG. 3 or the plough width adjustment mechanism shown in FIG. 1C.

The control unit may determine an actuator-control-signal in response to the field-data indicating that the agricultural plough is going up or down a slope. If the field-data indicates that the agricultural implement is or will be going up a longitudinal slope, the control unit may set the actuator-control-signal such that the plough width adjustment mechanism reduces the distance d between the plough bodies to decrease drag on the way up the hill. Similarly, if the field-data indicates that the agricultural vehicle is or will be moving down a slope, the control unit may set the actuator-control-signal such that the plough width adjustment mechanism increases angle $\alpha$ in FIG. 1C to increase the plough width, thereby increasing drag to reduce the speed of the agricultural vehicle down the slope.

If the field-data indicates that the soil in front of or currently being ploughed by the agricultural plough is of high density, the control unit may set the actuator-control-signal such that parts of the plough implement are moved laterally by means of the plough width adjustment mechanism. In particular, in denser soils, the actuator-control-signal may be set to reduce the angle $\alpha$ between the main frame longitudinal axis L1 and the agricultural vehicle longitudinal axis L2, thereby reducing the drag in denser soil conditions. By contrast, if the soil density is low, the control unit may set the actuator-control-signal such that the angle $\alpha$ is increased, thereby increasing the plough width and the corresponding drag of the plough implement.

The contour-data may comprise averaged contour data, for instance averaged over the width of the plough (for lateral contour-data) or averaged over the length of the plough (for longitudinal contour-data). This can be used to improve the ploughing operation for the majority of the plough bodies on the plough implement and result in overall good control of the actuator mechanism such that it is not adjusted too frequently. Also, using such an averaged value can be considered as looking forward to determine if any unevenness lasts for sufficiently long to warrant changing the lateral arrangement of the plough implement with respect to the agricultural work vehicle.

It will be appreciated that the change in lateral position may be based on one or more of the field-data discussed above.

Figure 5:
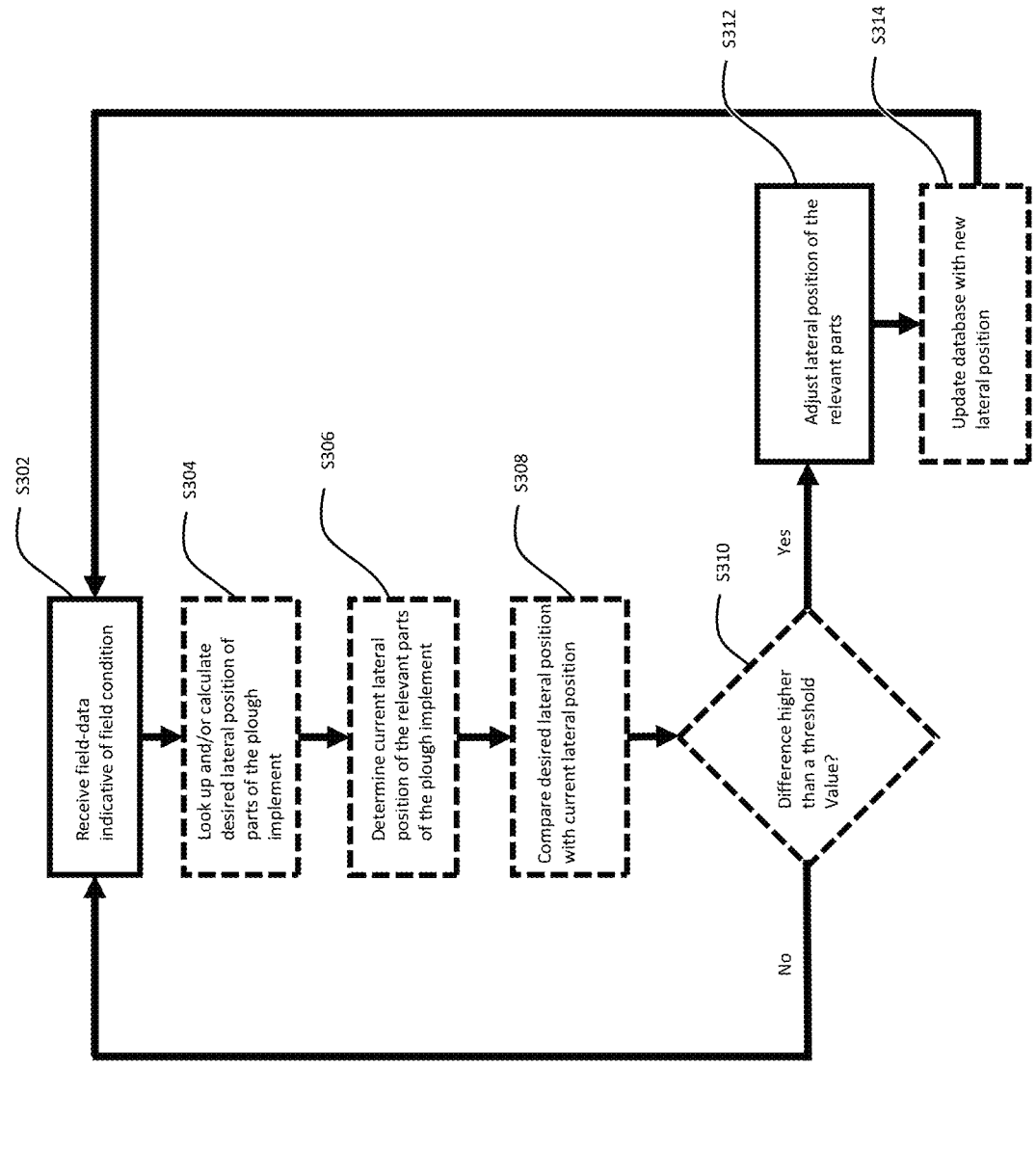
FIG. 5 shows a flow diagram for a method of adjusting the lateral position of an agricultural plough implement according to an embodiment of the present disclosure.

Turning to FIG. 5, there is shown a flow diagram of a method for adjusting the lateral position of parts of the plough implement (e.g. one or more plough bodies) with respect to the agricultural work vehicle according to an embodiment of the present disclosure. In this embodiment, the control unit will receive field-data from a sensor that is either connected to or associated with the plough implement 10 and/or the agricultural work vehicle 7.

In more detail, in a first step S302 the control unit receives field-data indicative of field conditions of a field across which the plough implement is being moved. In the method 300 illustrated in FIG. 5, the field-data is received from a sensor that determines one or more live data associated with the field condition. In one embodiment, described above with respect to FIG. 2, an optical sensor 74 may be provided to determine parameters indicative of the field contours ahead of the agricultural work vehicle 7. This field contour parameter is fed back by the sensor to a control unit that is associated with either the agricultural work vehicle 7 or the plough implement 10. The control unit may use the field-data determined by the sensor to identify a lateral slope in the field.

Based on the information received by the control unit S302, the control unit may optionally look up and/or calculate a desired lateral position of the plough implement (or parts thereof) in a step S304. In one example, the desired lateral position may be changed to compensate for gravitational forces acting on the plough implement due to a sloping ground contour, as will be described in more detail with reference to FIG. 6.

In another optional step S306, the control unit may determine the current lateral position of relevant parts of the plough implement with respect to the agricultural work vehicle. As discussed above, this may either be done by further sensors, such as sensors determining the position of hydraulic actuators of the depth adjustment apparatus, or may be retrieved from a database within the memory of the control unit.

In a further optional step S308, the control unit may compare the desired lateral position with the determined current lateral position. In an optional step S310, the control unit compares the difference between the desired lateral position and the current lateral position with a predetermined threshold value. The threshold value may be set by the manufacturer or by the operator before or during the ploughing operation. If in step S310, the difference between the desired lateral position and the current lateral position is determined to be higher than the threshold value, then method 300 may move on to step S312. Otherwise, if the difference between the desired lateral position and the current lateral position is lower than the threshold value, the method 300 is restarted with step S302 outlined above.

In a step S312, the lateral position of the at least one ground engaging tool is adjusted by means of the actuator mechanism controlled by the control unit. It should be noted that steps S304 to S310 are optional steps that will improve the accuracy of the lateral position adjustment. However, it is also feasible to remove steps S304 to S310 and perform a lateral adjustment per step S312 directly in response to field-data received in step S302. For example, if the sensor data is indicative of the field contours and the control unit subsequently determines the presence of a lateral slope, the control unit may directly move parts of the plough implement lateral up the slope with respect to the work vehicle in step S312, without consideration of the exact lateral position desired or the current lateral position. In another embodiment, if the sensor data is indicative of the field contours and the control unit subsequently determines the presence of a lateral slope in the field, the control unit may determine a desired increase in lateral position and ignore the current lateral position.

A further optional step S314 for updating the database with a new lateral position of the plough implement may follow step S312. In step S314, the control unit may determine the lateral position of the plough implement with respect to the work vehicle after the adjustment in step S312 and save this value in the database of the control unit's memory as a new "current lateral position". In this way, the database entries of the current lateral position are continuously updated as the lateral position is adjusted with the adjustment mechanism.

Once the database has been updated with the new lateral position, the method 300 may be restarted at step S302 for receiving field-data indicative of the field condition and/or the plough implement operation.

Figure 6:
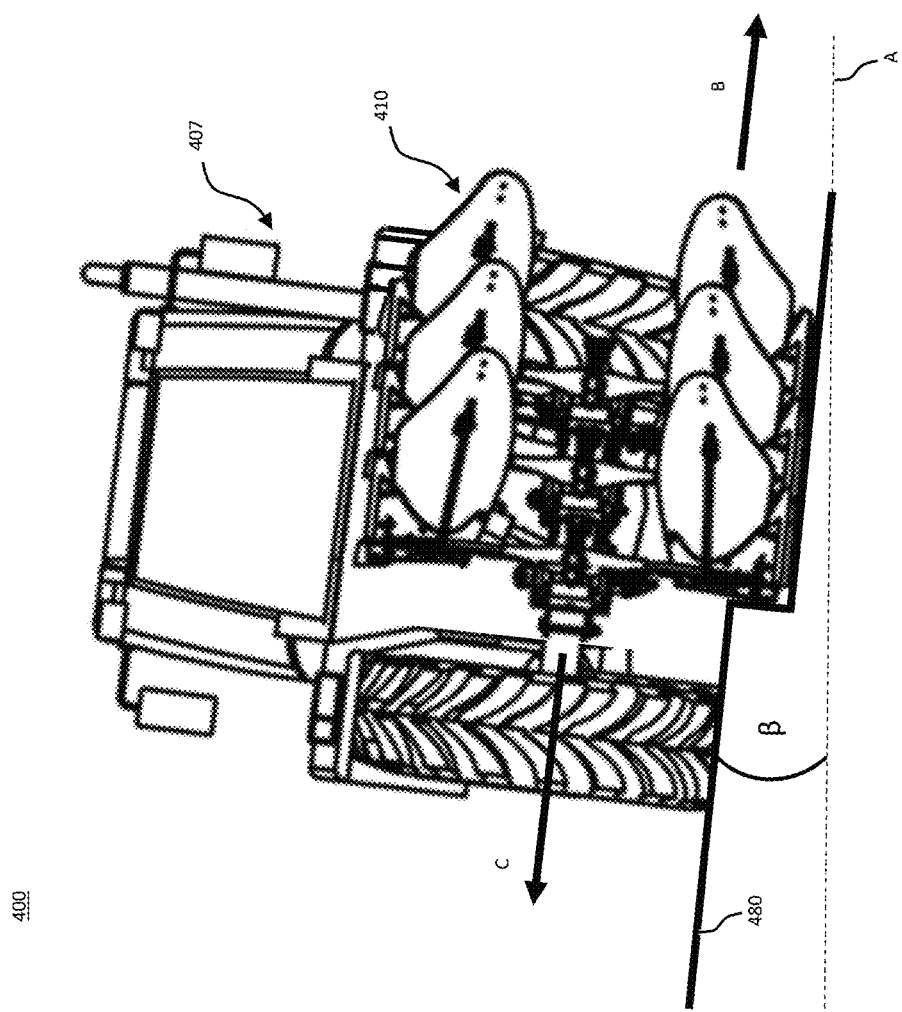
FIG. 6 shows an agricultural plough arrangement travelling across a lateral slope.

FIG. 6 shows a schematic representation of an agricultural plough arrangement 400 on a lateral slope. The agricultural plough arrangement comprises an agricultural work vehicle 407 and an agricultural plough implement 410. In this example, the plough implement 410 is attached to the back of the agricultural work vehicle 407. However, it will be appreciated that the plough implement 410 could also be attached to the front of the agricultural work vehicle 407.

As shown in FIG. 6, the ground surface 480 is laterally sloped, that is it falls from one side of the plough 400 to the other. The term "lateral slope" or "laterally sloped" should be understood as referring to a slope that is transverse to the direction of travel of the plough 400. The ground surface 480 may be at an angle β with respect to a horizontal plane A. As the agricultural plough 400 travels across the laterally sloped ground surface 480, both the agricultural work vehicle 407 and the plough implement 410 lean towards the bottom of the slope. One of the consequences of this lateral slope is that gravity will pull the plough implement 410 down the slope, in direction B, which may result in a lateral displacement of the plough implement 410 with respect to the agricultural work vehicle 407. To counteract this lateral displacement caused by gravitational forces, a control unit (not shown) of the agricultural plough arrangement may be configured to laterally adjust the position of the plough implement 410 with respect to the agricultural work vehicle 407 in direction C.

As has been pointed out before, the lateral adjustment may either be achieved by shifting the main frame towards direction C with a lateral sliding mechanism or by pivoting the main frame of the plough implement 410 with the plough width adjustment mechanism in direction C.

In order to identify the laterally sloped surface 480, a control unit may receive field-data that is either stored in a memory (e.g. in a database or a look-up table) of the control unit or received as live-data from a sensor. In the example of FIG. 2, the field data may be ground-contour-data determined by a front sensor 74. In particular, the sensor 74 may be able to identify the particulars of the sloped ground surface 480 optically and provide the sensed parameters to the control unit. The control unit may calculate an actuator-control-signal for the actuator mechanism that shifts parts of the plough implement 410 (e.g. the main frame and the plough bodies) uphill in direction C with respect to the agricultural work vehicle 407, on basis of the ground-contour-data received by the sensor 74.

In an alternative embodiment, the agricultural plough arrangement may include a level sensor for determining the ground-contour-data associated with the laterally sloped ground surface 480 of FIG. 6. Again, this live-data may be provided to the control unit which, based on this ground-contour-data from the level sensor, determines the actuator-control-signal for moving the plough implement 10 laterally up the slope in direction C.

Figure 7:
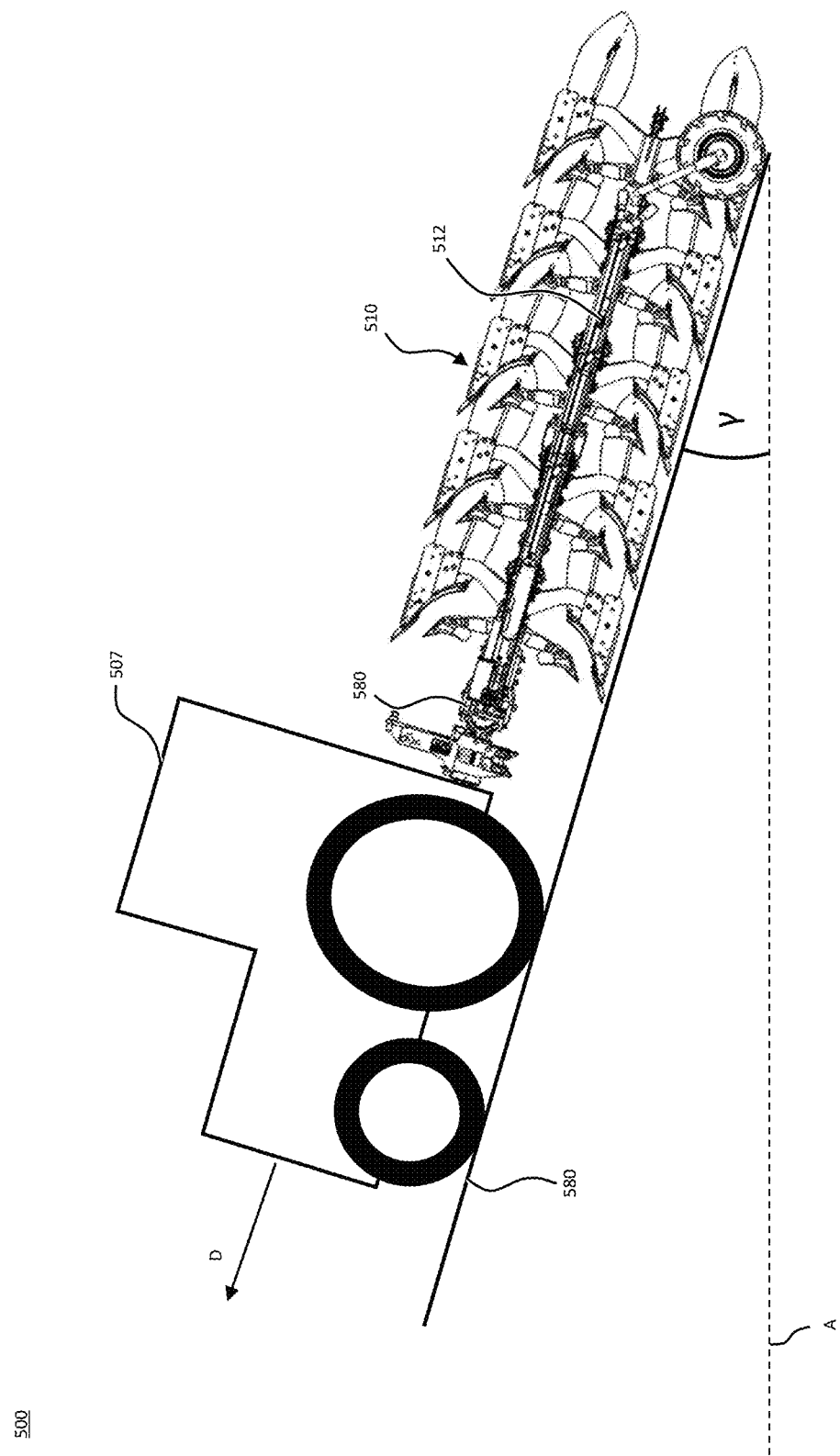
FIG. 7 shows an agricultural plough arrangement travelling up a longitudinal slope.

Turning to FIG. 7, there is shown another embodiment of an agricultural plough arrangement 500 according to the present disclosure. The agricultural plough arrangement 500 comprises an agricultural vehicle 507 and a plough implement 510.

In the embodiment of FIG. 7, the agricultural plough arrangement 500 travels up a longitudinally sloped ground surface 580. The ground surface 580 extends at an angle γ with respect to a horizontal plane A. It will be appreciated, that the term "longitudinally sloped" refers to a slope that is parallel to the direction of travel D of the agricultural plough arrangement 500. In this embodiment, the direction of travel D of the agricultural plough arrangement 500 is up the longitudinal slope 580 such that the slope 580 causes an incline in a longitudinal direction of the agricultural plough arrangement 500.

Similar to the embodiment shown in figures described with respect to FIG. 6, various sensors or look-up tables/databases may be provided to supply the control unit with field-data indicative of the parameters of the longitudinally sloped surface 580. Based on this field-data, a control unit (not shown) determines an actuator-control-signal for an actuator mechanism, such as the plough width adjustment mechanism explained above.

In the example of FIG. 7, the control unit may determine an actuator-control-signal that results in the plough width adjustment mechanism acting to yaw the main frame 512 of the plough implement 510 about pivot 580 such that the plough width of the plough implement 510 is decreased. A decrease in the plough width will reduce the drag experienced by the agricultural work vehicle 507 and support the uphill movement in direction D. Accordingly, the control unit may keep the plough implement 510 set to a reduced plough width for as long as the agricultural plough arrangement 500 travels up a hill in a longitudinal direction. Similarly, the control unit may be configured to increase the plough width as the agricultural plough arrangement 500 travels downhill, such that drag is increased and a constant ploughing speed is achieved across the field. The plough width might be changed based on the gradient of the slope.

In one embodiment, the plough width will only be changed once per working row. For example, based on the field-data the control unit may determine a desired plough width that applies to an entire working row. This may be done by averaging a number of different desired ploughing widths for different sections of the working row. For instance, if the control unit determines that the agricultural plough arrangement will be travelling up a hill for the same distance as it will be travelling downhill, it may set the plough width to a value that is the mean of a desired value for uphill travel and a desired level for downhill travel.

The listing or discussion of an apparently prior-published document in this specification should not necessarily be taken as an acknowledgement that the document is part of the state of the art or is common general knowledge.

Preferences and options for a given aspect, feature or parameter of the invention should, unless the context indicates otherwise, be regarded as having been disclosed in combination with any and all preferences and options for all other aspects, features and parameters of the disclosure.

The invention claimed is:

1. An agricultural plough arrangement comprising:
    an agricultural work vehicle;
    a plough implement connected to the agricultural work vehicle, wherein the plough implement comprises a main frame and at least one ground engaging tool coupled to the main frame;
    at least one actuator mechanism configured to move the at least one ground engaging tool laterally with respect to the agricultural work vehicle, wherein the at least one actuator mechanism comprises a lateral sliding mechanism configured to laterally shift the main frame relative to the agricultural work vehicle; and
    a control unit configured to:
        receive field-data indicative of conditions of a field across which the agricultural plough arrangement is being moved; and
        automatically determine an actuator-control-signal for the at least one actuator mechanism based on the field-data, wherein the actuator-control-signal is for shifting the at least one ground engaging tool laterally with respect to the agricultural work vehicle on the basis of the field-data received.

2. The agricultural plough arrangement of claim 1, wherein the control unit is configured to automatically provide the field-data to the at least one actuator mechanism for shifting the at least one ground engaging tool laterally with respect to the agricultural work vehicle.

3. The agricultural plough arrangement of claim 1, wherein the field-data comprises one or more of:
    ground-contour-data associated with current or previous ground-contours of the field across which the plough implement is being moved;
    obstacle-data associated with current or previous obstacle locations within the field across which the plough implement is being moved;
    soil-density data associated with current or previous density of soil within the field across which the plough implement is being moved.

4. The agricultural plough arrangement of claim 3, wherein the ground-contour-data comprises lateral-contour-data that is representative of lateral contours of the field across which the plough implement is being moved.

5. The agricultural plough arrangement of claim 4, wherein the lateral-contour-data comprises averaged contour data, that is averaged over the width of the plough implement.

6. The agricultural plough arrangement of claim 1, wherein a plurality of candidate-field-data is stored in a database and automatically determining the actuator-control-signal includes:
    receiving location data of the plough implement within the field; and
    using the location data to select one of the candidate-field-data as the field-data.

7. The agricultural plough arrangement of claim 1, wherein the control unit is configured to determine a current lateral arrangement of the at least one ground engaging tool with respect to the agricultural vehicle and compare the current lateral arrangement to a desired lateral arrangement, and wherein the control unit is configured to set the actuator-control signal to cause a lateral adjustment of the at least one ground engaging tool with respect to the agricultural work vehicle if a difference between the current and the desired lateral arrangement exceeds a threshold value.

8. The agricultural plough arrangement of claim 1, wherein the control unit is configured to set the actuator-control-signal such that the at least one ground engaging tool shifts laterally up a slope, relative to the agricultural work vehicle, if the agricultural plough arrangement is moved across the slope.

9. The agricultural plough arrangement of claim 1, wherein the control unit is configured to set the actuator-control-signal such that the at least one ground engaging tool is moved shifts laterally away from an obstacle that is being approached by the agricultural plough arrangement.

10. The agricultural plough arrangement of claim 1, wherein the actuator mechanism comprises
a plough width adjustment mechanism configured to yaw the main frame of the plough implement.

11. A computer-implemented method of operating an agricultural plough arrangement, the agricultural plough arrangement comprising:
an agricultural work vehicle;
a plough implement connected to the agricultural work vehicle, wherein the plough implement comprises a main frame and at least one ground engaging tool coupled to the main frame;
at least one actuator mechanism configured to move the at least one ground engaging tool laterally with respect to the agricultural work vehicle, wherein the at least one actuator mechanism comprises a lateral sliding mechanism configured to laterally shift the main frame relative to the agricultural work vehicle,
wherein the method comprises:
receiving field-data indicative of conditions of a field across which the agricultural plough arrangement is being moved;
automatically determining an actuator-control-signal for the at least one actuator mechanism based on the field-data, wherein the actuator-control-signal is for shifting the at least one ground engaging tool laterally with respect to the agricultural work vehicle on the basis of the field-data received.

12. The method of claim 11, wherein the actuator-control-signal is for shifting the at least one ground-engaging tool laterally with respect to the agricultural work vehicle such that the at least one ground-engaging tool is shifts laterally up a slope, relative to the agricultural vehicle, if the agricultural plough arrangement is moved across the slope.

13. The method of claim 11, wherein the field-data comprises one or more of:
ground-contour-data associated with current or previous ground-contours of the field across which the plough implement is being moved;
obstacle-data associated with current or previous obstacle locations within the field across which the plough implement is being moved;
soil-density data associated with current or previous density of soil within the field across which the plough implement is being moved.

14. The method of claim 11, wherein the actuator-control-signal is for shifting the at least one ground-engaging tool laterally with respect to the agricultural work vehicle such that the at least one ground-engaging tool shifts laterally away from an obstacle that is being approached by the agricultural plough arrangement.

15. An agricultural plough arrangement comprising:
a plough implement configured to connect to an agricultural work vehicle, wherein the plough implement comprises a main frame and at least one ground engaging tool coupled to the main frame;
at least one actuator mechanism configured to move the at least one ground engaging tool laterally with respect to the agricultural work vehicle, wherein the at least one actuator mechanism comprises a lateral sliding mechanism configured to laterally shift the main frame relative to the agricultural work vehicle; and
a control unit configured to:
receive field-data indicative of conditions of a field across which the agricultural plough arrangement is being moved; and
automatically determine an actuator-control-signal for the at least one actuator mechanism based on the field-data, wherein the actuator-control-signal is for shifting the at least one ground engaging tool laterally with respect to the agricultural work vehicle on the basis of the field-data received.

16. The agricultural plough arrangement of claim 15, wherein the field-data comprises one or more of:
ground-contour-data associated with current or previous ground-contours of the field across which the plough implement is being moved;
obstacle-data associated with current or previous obstacle locations within the field across which the plough implement is being moved;
soil-density data associated with current or previous density of soil within the field across which the plough implement is being moved.

17. The agricultural plough arrangement of claim 16, wherein the ground-contour-data comprises lateral-contour-data representative of lateral contours of the field across which the plough implement is being moved.

18. The agricultural plough arrangement of claim 15, wherein the at least one actuator mechanism comprises a plough width adjustment mechanism configured to yaw the main frame of the plough implement.

19. The agricultural plough arrangement of claim 15, wherein the control unit is configured to set the actuator-control-signal such that the at least one ground engaging tool shifts laterally away from an obstacle that is being approached by the agricultural plough arrangement.

20. The agricultural plough arrangement of claim 15, wherein the control unit is configured to set the actuator-control-signal such that the at least one ground engaging tool shifts laterally up a slope, relative to the agricultural work vehicle, if the agricultural plough arrangement is moved across the slope.

* * * * *